United States Patent [19]

Braff et al.

[11] Patent Number: 4,644,533

[45] Date of Patent: Feb. 17, 1987

[54] PACKET SWITCH TRUNK CIRCUIT QUEUEING ARRANGEMENT

[75] Inventors: Martin Braff, Aberdeen; Michael G. Hluchyj, Little Silver, both of N.J.

[73] Assignees: American Telephone & Telegraph Company, New York, N.Y.; AT&T Information Systems Inc., Morristown, N.J.

[21] Appl. No.: 730,995

[22] Filed: May 6, 1985

[51] Int. Cl.⁴ .............................................. H04J 3/24
[52] U.S. Cl. ......................................... 370/94; 370/60
[58] Field of Search ............................ 370/60, 94, 85; 340/825.5

[56] References Cited

U.S. PATENT DOCUMENTS

| | | | |
|---|---|---|---|
| 4,472,801 | 9/1984 | Huang | 370/60 |
| 4,516,238 | 5/1985 | Huang et al. | 370/60 |
| 4,538,259 | 8/1985 | Moore | 370/94 |
| 4,542,497 | 9/1985 | Huang et al. | 370/60 |
| 4,583,219 | 4/1986 | Riddle | 370/60 |

OTHER PUBLICATIONS

"Queueing and Framing Disciplines for a Mixture of Data Traffic Types" A. G. Fraser and S. P. Morgan, *AT&T Bell Laboratories Technical Journal*, vol. 63, No. 6, Jul.–Aug. 1984, pp. 1061–1087.
"A New Local Area Network Architecture Using a Centralized Bus" Anthony S. Acampora and Michael G. Hluchyj, *IEEE Communications Magazine*, vol. 22, No. 8, Aug. 1984, pp. 12–21.
"Pack Up Your Data in Our New Kit Bag", Judith G. Brinsfield and David A. Schriftgiesser, *AT&T Bell Laboratories Record* Mar. 1985, pp. 4–7,9.

*Primary Examiner*—Douglas W. Olms
*Assistant Examiner*—Curtis Kuntz
*Attorney, Agent, or Firm*—John A. Caccuro

[57] ABSTRACT

A trunk circuit interfaces a multichannel data signal to a communication facility using a high priority queue (HPQ) memory, a low priority queue (LPQ) memory, and a data packet sorter including a separate LPQ counter for each data channel. Each LPQ channel counter keeps track of data packets from the associated channel which are stored in the LPQ memory. The packet sorter sorts data packets according to size. Small data packets from each channel which are smaller than a predetermined length are sorted for storage in the HPQ memory only when the associated LPQ channel counter is zero. Small data packets having a non-zero LPQ channel count and large data packets are stored in the LPQ memory. The trunk circuit first transmits data packets from the HPQ memory and then from the LPQ memory.

12 Claims, 6 Drawing Figures

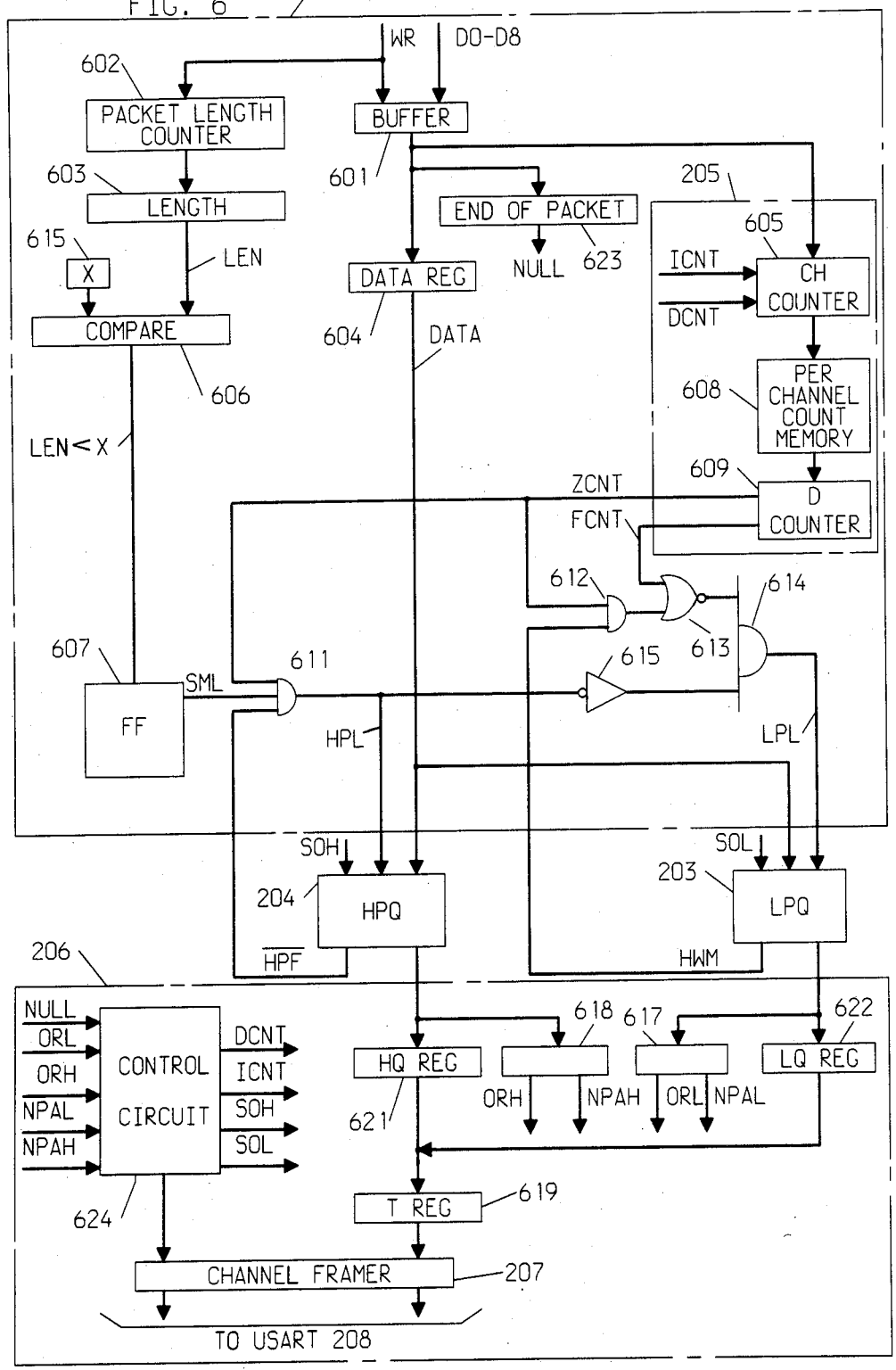

PACKET SWITCH TRUNK CIRCUIT QUEUEING ARRANGEMENT

TECHNICAL FIELD

This invention relates to packet switching networks and, more particularly, to a trunk circuit for interconnecting two packet switch nodes over a communication trunk.

BACKGROUND OF THE INVENTION

Interactive terminals and other data devices typically transmit information in intermittent bursts. Packet switching systems, including some local area networks (LAN), enable efficient communications between different data devices, connected together over a data bus, by breaking up the bursty data transmissions into short data packets and by multiplexing together the data packets from several different data devices onto the data bus. The location of a packet switching system is often referred to as a node. When internodal data communication is required, a trunk circuit is utilized to interface the packet nodes to the private or public facilities (trunks) which interconnect the nodes. The design of such trunk circuits or modules for interfacing wideband nodes via low-speed data trunks requires the consideration of the associated queueing delays on the trunk, particularly for interactive data messages. One known arrangement (described in the article entitled "Queueing and Framing Disciplines For a Mixture of Data Traffic Types", authored by A. G. Fraser and S. P. Morgan and published in the *AT&T Bell Laboratories Technical Journal*, July-August 1984, Vol. 63, No. 6, Part 2) utilizes a queueing discipline whereby short interactive data messages are given priority over longer data messages. That arrangement, however, requires separate data queues for each data channel of the trunk circuit. To keep trunk circuit cost low these queues are implemented in software rather than in hardware circuits.

SUMMARY OF THE INVENTION

According to the present invention, a trunk circuit packet sorter utilizes only one high priority queue (HPQ) memory and one low priority data queue (LPQ) memory for all of the data channels of the trunk circuit, and requires a separate LPQ counter for each data channel. Each LPQ channel counter keeps track of data from the associated channel which is stored in the LPQ memory. The packet sorter sorts data packets according to size. Small data packets, less than a predetermined length, from each data channel are sorted for storage in the HPQ memory only when the LPQ counter associated with that data channel is zero. That is, a smaller data packet from a channel is stored in the HPQ memory when there is no data from that channel in the LPQ memory. Small data packets having a non-zero LPQ channel count and large data packets are stored in the LPQ memory. This assures that data packets from the same channel will not be transmitted out of order.

The packet sorter is part of the trunk circuit which enables internodal data transmission over a trunk facility. The trunk circuit transmits data packets from the LPQ memory only after having transmitted all of the data packets from the HPQ memory. Data packets are grouped together to form a data frame for transmission over the trunk facility.

BRIEF DESCRIPTION OF THE DRAWING

The characteristics and operation of the present invention will be more apparent from the following detailed description taken in conjunction with the drawing in which:

FIG. 6 shows a block diagram of the transmit part of the trunk circuit.

DETAILED DESCRIPTION

Figure 1:
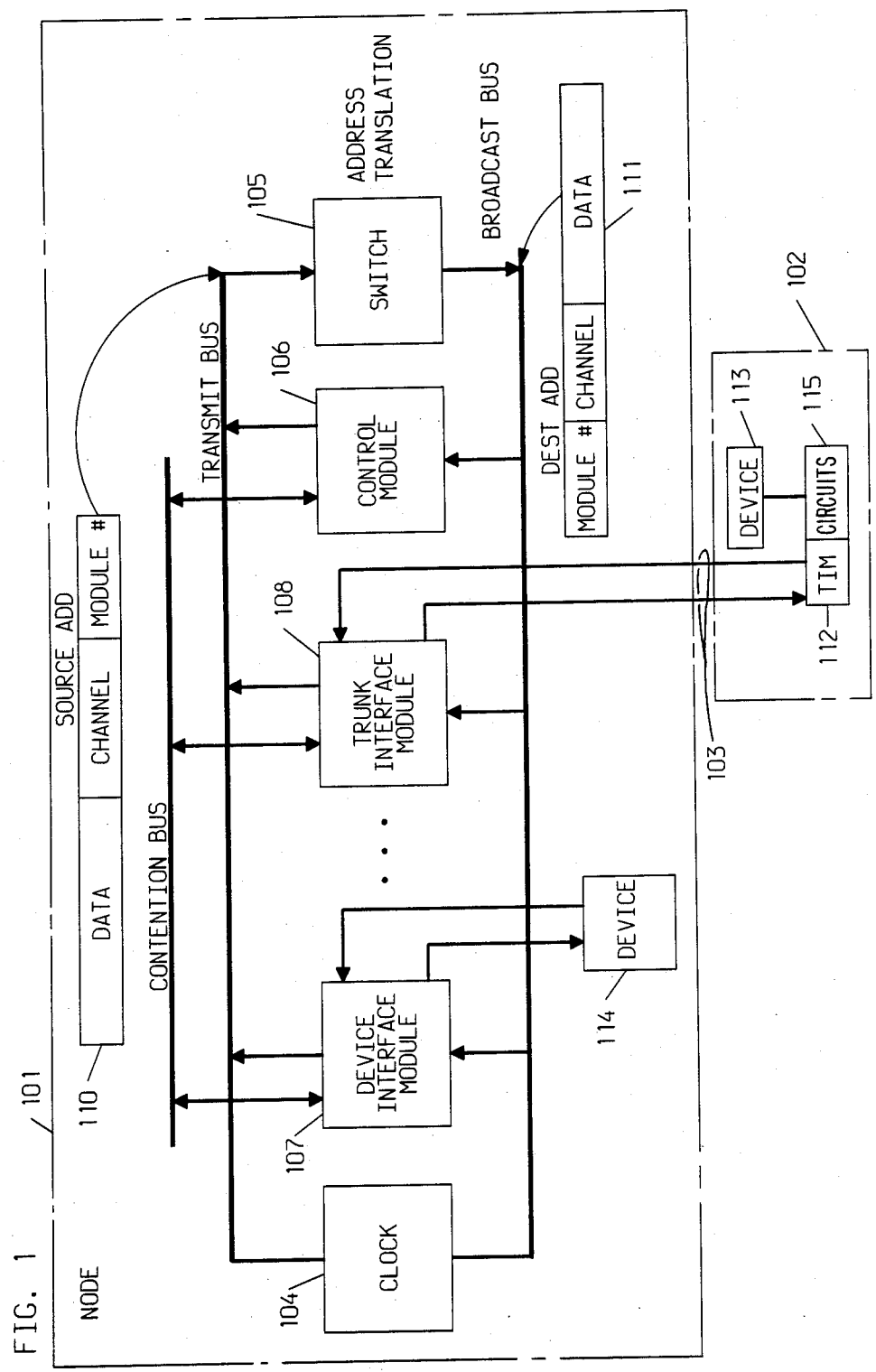
FIG. 1 shows the application of a trunk circuit interfacing a trunk facility to a node.

Shown in FIG. 1 is an illustrative application of a trunk circuit useful for interfacing nodes 101 and 102 to an internodal trunk facility 103. The nodes 101 and 102 may be a packet switching system or more specifically a local area network (LAN) which interconnects nodes, concentrators and devices (such as terminals, computers, workstations, host printers, etc.). Such an LAN is described in the article entitled "A New Local Area Network Architecture Using A Centralized Bus", authored by Anthony S. Acampora and Michael G. Hluchyj and published in the *IEEE Communication Magazine*, August 1984, Vol. 22, No. 8.

As FIG. 1 shows, a node also contains a clock module 104, a switch module 105, a control module 106, a device interface module 107 and trunk interface module 108 (also referred to as a trunk circuit) along with the transmit, broadcast, and contention data busses. The clock module 104 is responsible for system timing, switch module 105 translates a data source address to a data destination address under control of control module 106. The contention bus is used by the interface modules (107, 108) to gain access to the time-slot multiplexed transmit bus. The transmit bus and broadcast bus are used for sending and receiving packets, respectively. The header of each source packet 110 placed on the transmit bus by an interface module contains a source address consisting of a module number followed by a channel number. The module number uniquely identifies the transmitting interface module, and the channel number is used to distinguish among the different conversations passing through that module.

As FIG. 1 shows, each packet placed on the transmit bus is removed by the switch module 105 which translates the source module and channel numbers to the destination module and channel numbers on the destination packet 111. The specific translation is established by a prior call-set-up procedure. The packet is then retransmitted on the broadcast bus where it is received by the specified destination module. In this way, a virtual circuit transport mechanism is implemented, wherein common control processor 106 at node 101 handles call step-up and take-down along with necessary maintenance and administration functions.

Assume a data transmission from device 114 of node 101 to device 113 of node 102. The user enters data into device 114 which is then transmitted to device interface module 107 where it contends for transmission time on the transmit bus. When device 114 gets a chance to transmit, it sends a source packet 110 over the transmit bus to switch 105 which translates the source module address and channel number to the address of trunk circuit 108 and perhaps a new channel number. Trunk circuit 108 receives the data packet over the designated channel along with other data packets on other channels. In accordance with the present invention, trunk circuit 108 combines the data packets for transmission over trunk facility 103 to node 102. At node 102 the data packets are received by another trunk circuit 112. In a similar manner as previously described, trunk circuit 112 transmits the data via the circuits 115 of node 102 to device 113. Once the user at device 114 of node 101 is through transmitting, a signal is sent to control module 106, which in turn informs the switching module 105 to take down the connection, and control module 106 informs the control module of node 102 as well.

The transmission rate between nodes 101 and 102 depends upon the type of trunk facility 103 employed. When trunk facility 103 is a low-speed, data facility, such as digital data system (DDS) trunks, efficient data transmission requires that the trunk circuits 108, 112 utilize efficient queueing disciplines. This is particularly important when the devices communicate using interactive "bursty" type of data, such as when terminals communicate with computers. As will be described in the following paragraphs, the present invention utilizes a queueing discipline which assures that the interactive messages get priority over and are interspersed with bulk message data (for example, a file transfer) in such a way that delay requirements for mixed data types are met even when the trunk is heavily used.

In the following description, when an element has an associated reference number, the figure where that referenced element is first referenced is the first digit of the reference number. Thus, for example, memory 203 is first referenced in FIG. 2.

Figure 2:
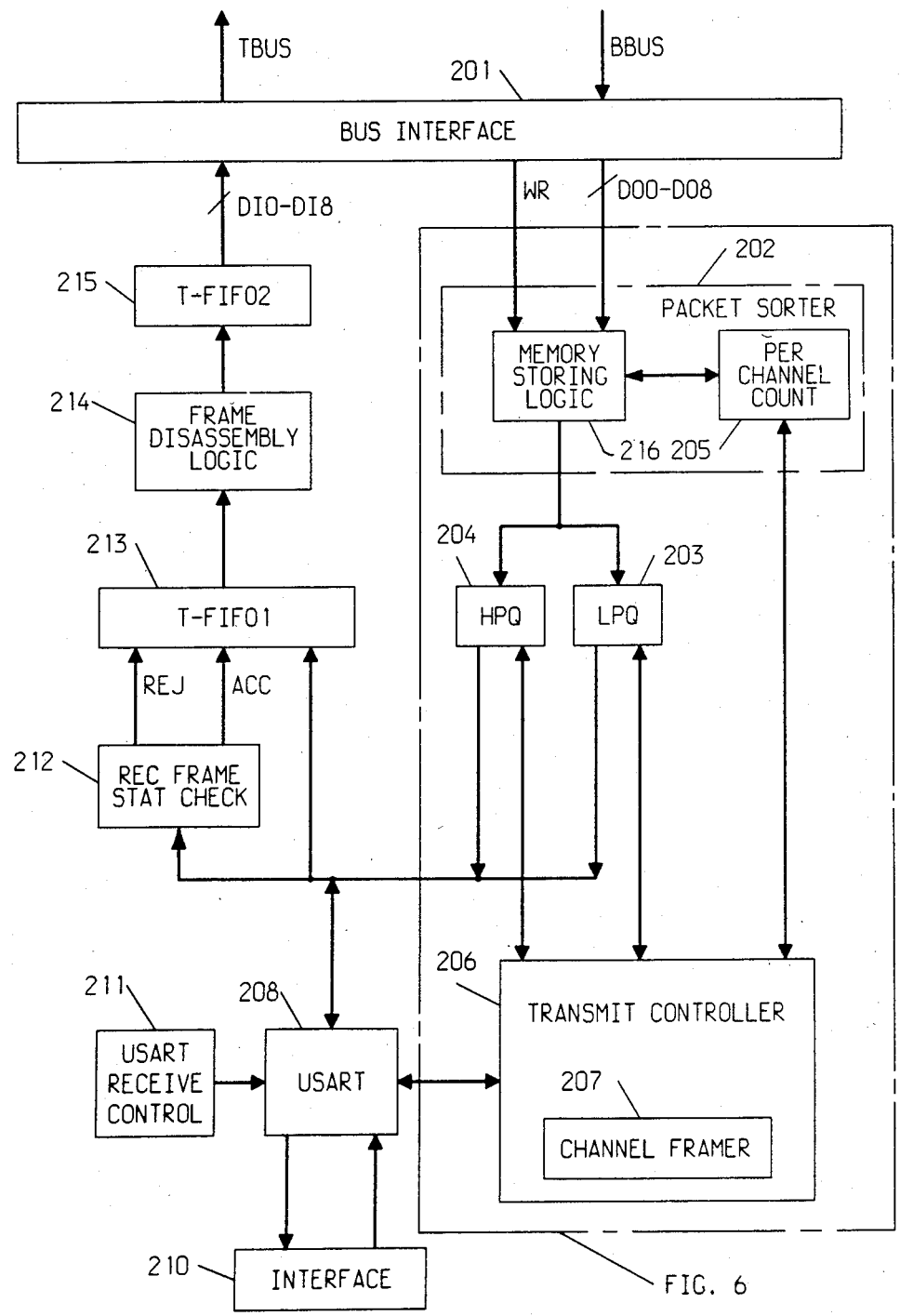
FIG. 2 shows a block diagram of the trunk circuit.
Figure 3:
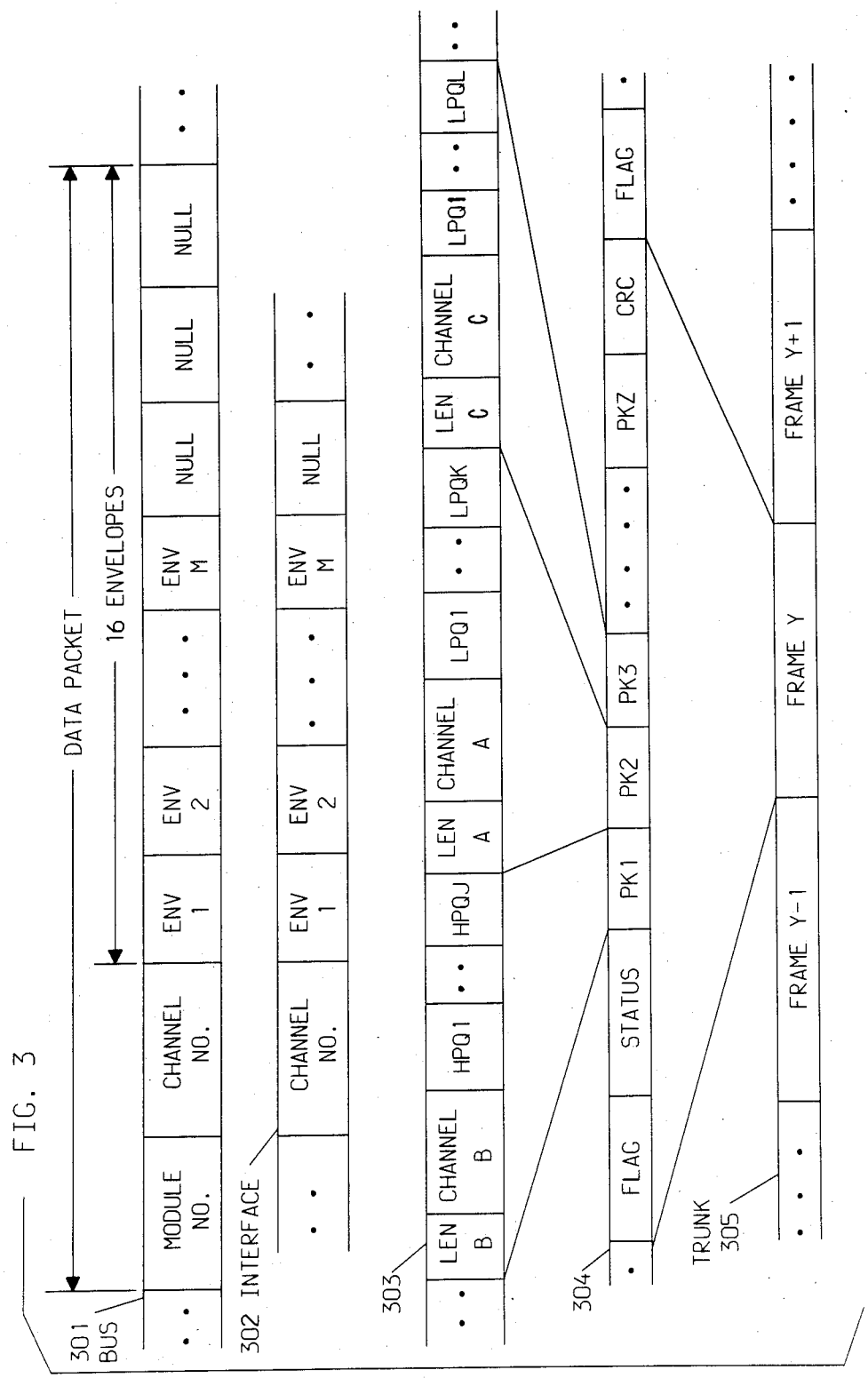
FIG. 3 shows the data format utilized by the trunk circuit.

Shown in FIG. 2 is a functional block diagram of trunk circuit 108. In a well-known manner, interface 201 interfaces trunk circuit 108 to the transmit bus TBUS and contention bus as well as to the broadcast bus BBUS shown in FIG. 1. The data format at different locations of the trunk circuit 108 is illustrated in FIG. 3. The data packets on the broadcast bus BBUS, illustrated by format 301, includes a module number, a channel number and 16 data envelopes. When the module number of the data packet 301 designates trunk circuit 108 to receive the data packet, bus interface 201 does a parity check on the data packet. If the data packet is error-free then, as shown by format 302, interface 201 strips off the module number and eliminates all null data envelopes. A single null envelope is appended which indicates the end of the data packet.

Figure 4:
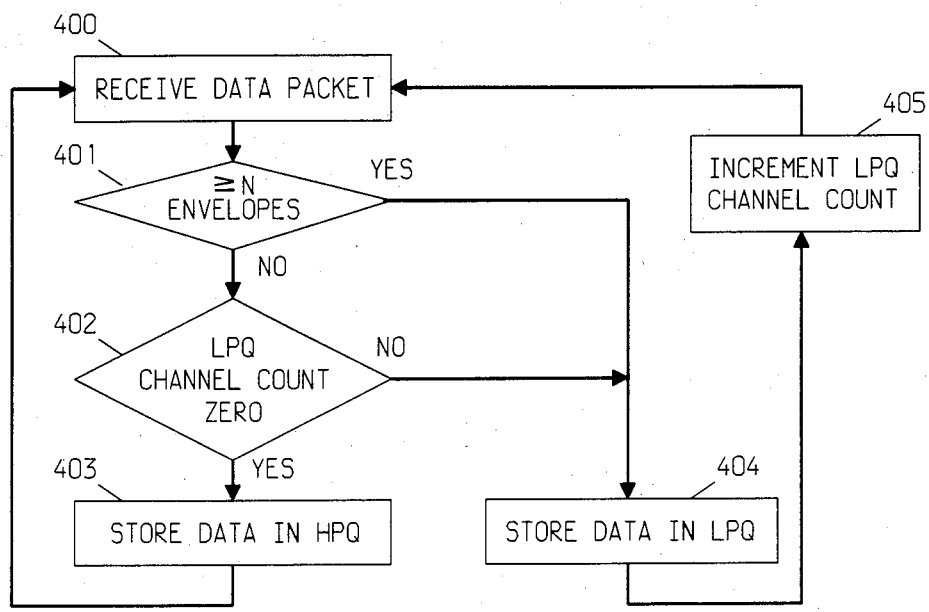
FIG. 4 shows a flow chart describing the operation of the packet sorter of the trunk circuit.

The operation of data packet sorter 202 makes reference to the flow chart shown in FIG. 4. The data packet sorter circuit 202 receives data packets, 400, and compares the number of data envelopes in the received data packets against a predetermined size N. Note, a data packet contains data from only one channel. If the number of data envelopes in a received data packet is smaller than N, the LPQ channel packet counter for the channel number associated with the received data packet is checked, 402, for a zero count. If the LPQ channel packet counter 205 is zero the data packet is written into the HPQ memory 204 in step 403. However, if the data packet has less than N bytes and LPQ channel packet count 205 is not zero, it is written into the LPQ memory and the LPQ packet counter is incremented 405. Finally, if the data packet has N or more bytes it is stored in LPQ memory 203, in step 404, and the LPQ channel counter 205 is incremented in step 405.

The present data sorter maintains data sequence in each channel even when the data from one channel is in both the LPQ memory and HPQ memory, providing that all new data from a channel goes into the LPQ memory as long as any data from the channel is stored in the LPQ memory. Both LPQ memory 203 and HPQ memory 204 may be implemented using any of the well known varieties of first-in-first-out (FIFO)type memory chips. Because HPQ memory 204 holds the shorter data messages it would probably be of much smaller size than the LPQ memory 203.

Figure 5:
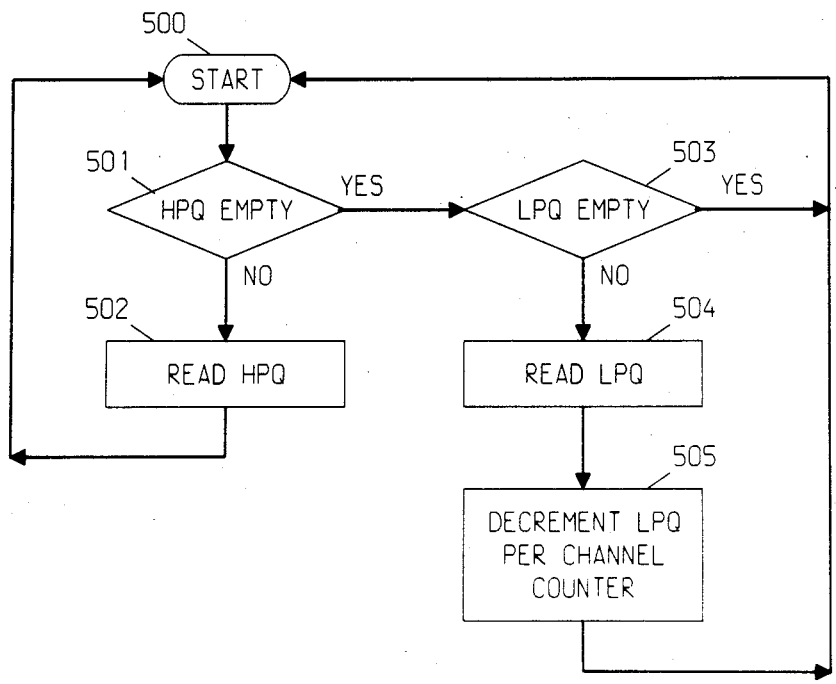
FIG. 5 shows a flow chart describing the memory read operation of the trunk circuit.

The transmit control circuit 206 reads data packets from the LPQ memory 203 and HPQ memory 204 and assembles them in channel framer circuit 207. This operation is described by the flow chart shown in FIG. 5. After the transmit control circuit 206 starts, in step 500, it checks, in step 501, if HPQ memory 204 is empty, i.e., no data packets therein. If HPQ memory 204 is not empty, a data packet is read, 502, and the process (500, 501, 502) continues until all data packets are read. When HPQ memory 204 is empty, the LPQ memory 203 is checked in step 503. If the LPQ memory is empty the transmit control circuit 206 returns to start location 500 and cycles through steps 500, 501 and 503 until either the LPQ or HPQ memory is not empty.

If LPQ memory 203 has data packets they are read one at a time, 504, and the LPQ per channel counter associated with that data packet is decremented, 505. Thereafter control returns to step 500 and then the HPQ memory is again checked, step 501. Thus, the HPQ memory 204 is checked, step 501, after each LPQ memory read, step 505, to assure that the high priority data packets of HPQ memory 204 are transmitted prior to the low priority data packets of LPQ memory 203.

Assuming that HPQ memory is empty, the sequence of steps 500, 501, 503, 504 and 505 continues until all data packets are read from LPQ memory 203. It should be noted that if transmit control circuit 206 is in the process of removing a data packet from LPQ memory 203 and a new data packet arrives in the empty HPQ memory 204, it completes the removal of the data packet from LPQ memory 203 and then begins serving HPQ memory 204 and continues to do so until HPQ memory 204 is empty. Transmit control circuit 206 includes a channel framer 207 which receives the data packets from LPQ and HPQ memories and formats them into a data frame for transfer to a universal synchronous asynchronous receive transmit circuit (USART) 208. The USART transmits the data frame to trunk facility 103.

The channel framing for the trunk circuit could utilize any of the well known formats. The disclosed trunk circuit utilizes a mixed frame, i.e., LPQ and HPQ data packets are mixed together in a frame. Complete packets are transmitted over the trunk until the total number of transmitted bytes exceeds some maximum value. Different maximum frame lengths can be specified depending on whether the frame contains data from the HPQ (e.g., 256-byte limit for frames containing only LPQ packets, 64-byte limit for frames containing one or more HPQ packets).

As shown in 303, as each data packet from HPQ memory 204 is read, the data bytes (HPQ1-HPQJ) are counted and packaged together with the channel number (chan B) and packet length (len B) to form data packet PK1 of 304. Similarly, as each data packet from LPQ memory 203 is read, the data bytes (LPQ1-LPQK) are counted and packaged together with the channel number (chan A) and packet length (len A) to form data packet PK2 of 304. It should be noted that while data packets are discussed herein as including data bytes of 8 bits, in general the data packets can more generally include data envelopes of any bit length.

As shown in 304, data packets PK1-PKZ are assembled together with a flag, status, and error detection code CRC to form a data frame (Frame Y) of 305. Note the length of data packets PK1-PKZ and data frames Y−1, Y, Y+1, are different. Data frame lengths can be predetermined so as to control system efficiency and delay characteristics. Generally long frames increase efficiency and short frames decrease frame delays. A sorted framing discipline can also be utilized by the present trunk circuit whereby LPQ and HPQ data packets may be combined to form a frame, but any LPQ data packet is prevented from being added to a frame that contains any HPQ data packets.

As shown in FIG. 2, the transmit part of the trunk circuit (FIG. 6) includes a packet sorter 202, LPQ memory 203, HPQ memory 204, and transmit controller 206. As shown in FIG. 6, the packet sorter 202 includes per channel counter 205 and memory storing logic 216, which is shown as every circuit in 202 which is not part of per channel counter 205. In FIG. 6, transmit controller 206 includes control circuit 624, channel framer 207 and a variety of registers.

The remaining detailed description of trunk circuit 108 makes joint reference to FIGS. 2, 3 and 6. Data packets arriving over broadcast bus (BBUS) are serially loaded into bus interface 201 and then loaded into buffer 601 in parallel over leads D0-D8 using the data write WR signal. As the data packet 302 is loaded into buffer 601 a length counter 602 is incremented by signal WR to compute the number of envelopes in that data packet. When the data packet is completely received, the contents of the length counter 602 are transferred into the length register 603 making the length counter 602 available for the next data packet.

At this time, the first data byte in the packet, the channel number of 302, is transferred simultaneously from buffer 601 into the data register 604 and into the channel counter 605. The end of packet circuit 623 detects if the data byte in buffer 601 is the null byte which separates data packets. A null signal is outputted to transmit control circuit 206 to prevent the null byte from being stored.

At this point the packet sorter decides to which memory (LPQ or HPQ) the packet is to be routed. To do that, first the contents LEN of length register 603 are compared in comparator 606 to a predetermined threshold value X set in unit 615. The threshold X can be set using a dip switch. If the contents LEN of length register 603 is less than the threshold X, that indication is set in data packet size flip-flop 607. The signal SML out of flip-flop 607 indicates that a small data packet is received. At the same time, the channel number in channel counter 605 is used to address a particular location in the per channel count memory 608. Memory 608 has a location for storing the count for each possible channel number of a data packet. The contents of the addressed memory location, which contains the number of packets stored in LPQ memory for that channel number, is transferred into D counter 609. Counter 609 outputs a signal FCNT indicating when the counter value is at its maximum (e.g., 255) and signal ZCNT indicating when the counter value is 0.

Gate 611 provides a data packet load signal HPL to HPQ memory 204 in response to three signals The three signals include the zero count signal (ZCNT) for that channel of the LPQ memory; the signal SML indicating a small data packet was received; and the signal HPF* indicating that the high priority queue 204 is not full. When the three conditions are met, AND gate 611 generates load signal HPL to load the data from data register 604 into high priority queue 204. If no load signal HPL is generated, the data is not loaded in the HPQ memory 204 and trunk circuit 108 determines if the data should be loaded into the LPQ memory 203 or discarded. When load signal HPL is at logic 0, inverter 615 enables AND gate 614.

At this point, the second memory full channel signal FCNT from counter 609 indicates whether the per channel count of that channel number is at its maximum value 255. If the count is 255, then signal FCNT disables gate 614, via NOR gate 613, from generating a load signal LPL for LPQ memory 203 and hence no more data for that channel number can be accepted into the low priority queue 203. Hence, signal FCNT prevents data from that channel number from being written into the low priority queue 203 and hence the data packet is discarded. Note, it is discarded in data register 604 by being written over by the next data word from buffer 601.

If the full count FCNT of that channel number has not been reached then the high water mark signal, HWM, from the low priority queue 203 is checked. The HWM signal indicates that the LPQ memory 203 is almost full and hence no new data packets should be written into LPQ 203. If the HWM signal is set (logic 1), then trunk circuit 108 discards new data packets arriving for all new channel numbers. Note, a new channel number is determined when the zero count signal ZCNT is logic 1 for that channel. Therefore, if ZCNT and HWM are both logic 1, indicating, respectively, a new channel and a LPQ memory 203 that is almost full, AND gate 612 is enabled gating a signal, through NOR gate 613, which inhibits gate 614 from generating a load signal LPL. If the data packets are not from a new channel then signal ZCNT is not at logic 1. Consequently, AND gate 614 is enabled by gates 612, 613 and load signal LPL is generated causing the data packet to be loaded into the LPQ memory 203.

When the data packet is loaded into the LPQ memory 203, transmit control circuit 206 generates signal ICNT which causes channel counter 605 to increment its count for the channel number associated with that data packet. When the data packet is subsequently removed from the LPQ memory 203, the corresponding channel number is loaded from transmit register 619 into channel counter 605 and transmit control circuit 206 generates a signal DCNT which decrements the count in counter 605 for that channel number.

Memories LPQ and HPQ each have a status register, 617 and 618, respectively, which indicates the status of each memory. Register 618 of HPQ memory 204 generates output ready signal ORH and new data packet available signal NPAH. Similarly, register 617 of LPQ memory 203 generates output ready signal ORL and new data packet available signal NPAL. Whenever signal ORH is logic 1, it indicates that a data packet is available and transmit control circuit 206 causes data to be read from HPQ memory 204 and into the high queue HQ register 621 and transferred into the transmit register 619 for subsequent transmission into USART 208. When signal ORH is not logic 1 the transmit control circuit 206 examines the state of signal ORL. When signal ORL is logic 1 data is read from LPQ memory 203 and into low queue LQ register 622 and transferred into transmit register 619.

Transmit control circuit 206 continues reading data from LPQ memory 203 until a new packet signal NPAH is received. A NPAH signal indicates that a new data packet has arrived in HQP memory 204 and it is ready for transmission. As previously discussed in FIG. 5, data packets in HPQ memory 204 are given priority over data packets in LPQ memory 203. Thus, as soon as a data packet is transmitted from LPQ memory 203, trunk control circuit 206 transmits any new data packets in HPQ memory 204 before continuing to transmit the next data packet from LPQ memory 203.

Thereafter, as previously described in FIGS. 2 and 3, using well known circuitry channel framer circuit 207 of transmit control circuit 206 then formats the data packets into the format shown by 303. The channel framer circuit 207 may establish frame size when one of the following conditions occur. The frame length can be set when both the LPQ or HPQ memories are empty, when the HPQ memory is empty, or when the frame has reached a predetermined length. Obviously, other criteria of conditions could be utilized to determine frame size. The data frames may also be formatted into the HDLC or other standard form by the USART 208 and then outputted. Note, if the data envelopes (HPQ1, LPQ1, etc., of 303) are not the standard byte size (i.e., 8 bits long) a byte stuffing algorithm is required as part of transmit control circuit 206. The USART 208 receives the data frame one byte at a time in parallel from the transmit control circuit 206 and transmits the data packet frames serially over standard interface 210 to trunk 103.

With reference primarily to FIG. 2, data is received by the receive part of USART 208 The USART 208 receives the HDLC frames from trunk 103 via standard interface 210 and when a frame is completely received the USART appends a status byte to indicate whether there were any errors associated with that frame. The status byte is examined by the receipt frame status check circuit 212 and if there is any error that frame is discarded by generating and sending a reject signal REJ to receive FIFO 213. If there are no errors, the frame is accepted by generating and sending an accept ACC signal to receive FIFO 213. Subsequently, frame disassembly circuit 214 disassembles the frame into data packets and converts the data to the format compatible with the bus interface circuit 201. Basically, frame disassembly circuit 214 uses the length fields of the frame (e.g., see frame 303) to determine packet boundaries. The length field enables the circuit to separate data packets, each data packet is then marked with null envelope separating the packets. These disassembled data packets are then loaded into transmit FIFO 215 for transmission via bus interface 201 to the TBus of trunk circuit 108.

It is anticipated that many other well known circuits can be utilized to implement some or all of the circuitry and functions of the present invention. While the present memory circuit invention is implemented using complementary metal oxide semiconductor (CMOS) technology it is anticipated that other embodiments using any of the well known discrete, hybrid or integrated circuit techniques can be utilized. Additionally, substantial parts of the functions provided in trunk circuit, particularly the logic and memory circuitry, can be implemented in software or using a microprocessor and associated firmware. Finally, while the present invention is described as being utilized in a trunk circuit for interfacing to a trunk, it more generally can be utilized with any type communication line.

While the present invention counts the number of data packets stored in the low priority queue, with a straightforward modification we could count the number of data packets stored in both the low and high priority queues. Whenever a packet is removed from either queue, the count would then be decremented. As a result, a data source which generates a stream of small data packets is prevented from obtaining priority service under heavy loads when packet queueing occurs.

Thus, what has been disclosed is merely illustrative of the present invention and other arrangements or methods can be implemented by those skilled in the art without departing from the spirit and scope of the present invention.

What is claimed is:

1. A data packet sorter for interfacing a received multichannel packet data stream to a communication line, said sorter comprising
    means for sorting received multichannel data packets equal to or greater than a predetermined size for storage in a first memory and for sorting multichannel data packets less than said predetermined size for storage in said first memory in response to a signal from an associated channel counter indicating that the count is not zero; and
    counter means including a channel counter associated with each channel of the received multichannel packet data stream for counting, for each channel, the number of data packets written into said first memory by incrementing said associated channel counter for each data packet written into said first memory and decrementing the associated channel counter for each data packet read from said first memory.

2. The data packet sorter of claim 1 wherein said sorting means includes means for storing said multichannel data packets less than said predetermined size in a second memory in response to a zero count signal from the associated channel counter.

3. The data packet sorter of claim 2 wherein said counter means further counts all data packets written into said second memory and decrements when each data packet is read from said second memory.

4. A trunk circuit for interfacing a received multichannel packet data stream to a communication trunk, said trunk circuit comprising
    a first memory;
    a second memory;
    means for sorting multichannel data packets equal to or greater than a predetermined size for storage in said first memory and for sorting multichannel data packets less than said predetermined size in said first memory in response to a signal from an associated channel counter indicating that the count is not zero;
    means for storing said multichannel data packets less than said predetermined side in said second memory in response to a zero count signal from the associated channel counter;

counter means including a channel counter associated with each channel of said received multichannel packet data stream for counting, for each channel, the number of data packets written into said first memory by incrementing said associated channel counter for each data packet written into said first memory and decrmenting the associated channel counter for each data packet read from said first memory; and means for reading a data packet from said first memory only after having first read all of the data packets from said second memory.

5. The trunk circuit of claim 4 further comprising a framing means for grouping data packets read from said first and said second memories into a data frame for output to said communication trunk.

6. The trunk circuit of claim 4 wherein said framing means further includes means for setting the frame length at a first predetermined number of data bytes when the data includes only data packets from said second memory and for setting the frame length at a second predetermined number of data bytes when the data includes data packets from both said first and second memories.

7. The trunk circuit of claim 4 wherein said second memory generates a full memory signal and wherein said sorting means is responsive to said full memory signal for storing all data packets in said first memory.

8. The trunk circuit of claim 4 wherein said first memory generates a high water mark signal indicating that said first memory is almost full and wherein said sorting means is responsive to said high water mark signal and a zero count signal from the channel counter means associated with a received data packet for inhibiting the writing of the received data packet into said first memory.

9. The trunk circuit of claim 4 wherein said associated channel counter means generates a full count signal when the number of data packets stored in said first memory for a channel exceeds a predetermined limit and wherein said sorting means is responsive to said full count signal for disabling the writing of any data packets from the full channel into said first memory.

10. A method of sorting a received multichannel packet data stream for transmission over a communication line, the method comprising the steps of:

sorting multichannel data packets equal to or greater than a predetermined size for storage in a first memory and for sorting multichannel data packets less than said predetermined size for storage in said first memory in response to a signal from an associated channel counter indicating that the count is not zero; and counting, for each channel of the received multichannel packet data stream, the number of data packets written into said first memory by incrementing an associated channel counter for each data packet written into said first memory and decrementing the associated channel counter for each data packet read for said first memory.

11. The method of sorting of claim 10 wherein said sorting step includes the steps of:

writing said data packets less than said predetermined size in a second memory when the associated channel counter is zero.

12. A method of operating a trunk circuit for interfacing a received multichannel packet data stream to a communication trunk, the method comprising the steps of:

sorting multichannel data packets equal to or greater than a predetermined size for storage in a first memory and for sorting multichannel data packets less than said predetermined size for storage in said first memory in response to a signal from an associated channel counter indicating that the count is not zero;

storing said multichannel data packets less than said predetermined size in a second memory in response to a zero count signal from the associated channel counter;

counting, for each channel of the received multichannel packet data stream, the number of data packets written into said first memory by incrementing said associated channel counted for each data packet written into said first memory and decrementing the associated channel counter for each data packet read from said first memory; and reading a data packet from said first memory only after having first read all of the data packets from said second memory.

* * * * *